United States Patent

Yashiro et al.

Patent Number: 5,242,730
Date of Patent: Sep. 7, 1993

[54] OPTICAL RECORDING MEDIUM

[75] Inventors: Toru Yashiro, Yokosuka; Yutaka Ueda, Yokohama, both of Japan

[73] Assignee: Ricoh Company, Ltd., Tokyo, Japan

[21] Appl. No.: 655,058

[22] Filed: Feb. 14, 1991

[30] Foreign Application Priority Data

Feb. 16, 1990 [JP] Japan .................................. 2-33782

[51] Int. Cl.$^5$ ............................................. B32B 3/00
[52] U.S. Cl. ......................................... 428/64; 428/65; 428/913; 369/288; 346/76 L; 346/135.1
[58] Field of Search ............... 428/64, 65, 913, 704; 430/945; 346/76 L, 135.1; 369/288

[56] References Cited

U.S. PATENT DOCUMENTS 3,660,084  5/1972  Vanheertum et al. .................. 96/1.6
4,415,650  11/1983  Kido et al. ........................ 346/76 L
4,899,168  2/1990  Osato et al. ......................... 428/65

FOREIGN PATENT DOCUMENTS 3-002091  1/1991  Japan .

Primary Examiner—Patrick J. Ryan
Assistant Examiner—W. Krynski
Attorney, Agent, or Firm—Cooper & Dunham

[57] ABSTRACT

An optical recording medium is composed of a substrate, and a recording layer formed thereon, which is made of (a) a first recording layer which contains a light-absorbing organic compound and can be deformed upon irradiation of light thereto, and (b) a second recording layer which includes a sulfide containing antimony in an amount of 50 atm % or more, and can be deformed in accordance with the deformation of the first recording layer.

13 Claims, 1 Drawing Sheet

OPTICAL RECORDING MEDIUM

BACKGROUND OF THE INVENTION

1. Field of the Invention

The present invention relates to an optical recording medium, and more particularly to an optical recording medium comprising a substrate, and a recording layer formed thereon, which recording layer is composed of (a) a first recording layer which comprises a light-absorbing organic compound and can be deformed upon irradiation of light thereto, and (b) a second recording layer which comprises a sulfide containing antimony in an amount of 50 atm % or more, and can be deformed in accordance with the deformation of the first recording layer, whereby optical recording can be performed.

2. Discussion of Background

Conventionally, an overwrite type of optical recording medium has been developed and used in practice, which comprises a substrate and a light-reflecting-and-absorbing dye-containing recording layer formed thereon, in which optical recording is carried out by applying a laser beam to the recording layer so that the illuminated section of the recording layer is removed, causing the formation of holes or indentations in the recording layer, as described in a text titled "Organic recording materials for optical disks" by "Abe", published by Bushin Shuppan Co., Ltd. in Japan.

In order to prevent foreign material in the air from adhering to the recording layer, the structure used in this type of recording medium is a so-called sandwich structure, which utilizes a pair of transparent substrates, each provided with a recording layer, or a pair of substrates, each comprising a protective substrate provided with a recording layer, joined together through an air space so that the recording layer is on the inside.

This type of conventional optical recording medium which uses a dye with light reflecting and light absorbing capabilities in the recording layer and records as the result of the formation of holes or indentations from the application of light, has the drawback that the recording sensitivity takes a large drop in the case where a protective layer is provided in close contact with the recording layer, because a change in shape occurs in the holes and indentations during recording.

In addition, even in the case where a protective layer is not provided, a great deal of recording laser power is required, in particular, to record at high speed and high density. If the recording laser power is low, a sufficient change in reflectance is not obtained.

Also, when the hole or indentation is formed, part of the recording layer which is removed is scattered as decomposed or melted material onto the surface of the other part of the recording film. The adherence of this material to the surface causes noise and errors to develop.

SUMMARY OF THE INVENTION

Accordingly, an object of the present invention is to provide, with due consideration to the drawbacks of such conventional materials, an optical recording medium in which a substantial change in reflectance can be obtained during recording at high speed and high density, even with low laser power, and in which no noise or errors develop as a result of the recording layer which is removed.

This object of the present invention can be achieved by an optical recording medium comprising a substrate and a recording layer formed thereon, which comprises (a) a first recording layer which comprises a light-absorbing organic compound and is deformed through decomposition caused by the irradiation of light thereon, and (b) a second recording layer which comprises a sulfide containing antimony in an amount of 50 atm % or more, and is deformed in accordance with the decomposition and deformation of the first layer.

BRIEF DESCRIPTION OF THE DRAWINGS

A more complete appreciation of the invention and many of the attendant advantages thereof will be readily obtained as the same becomes better understood by reference to the followed detailed description when considered in connection with the accompanying drawings, wherein.

DETAILED DESCRIPTION OF THE PREFERRED EMBODIMENTS

Figure 1:
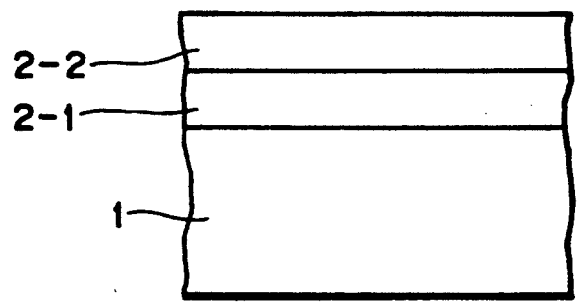
FIG.1 to FIG.3 are explanatory views of the laminated structure of examples of the optical recording medium of the present invention.
Figure 2:
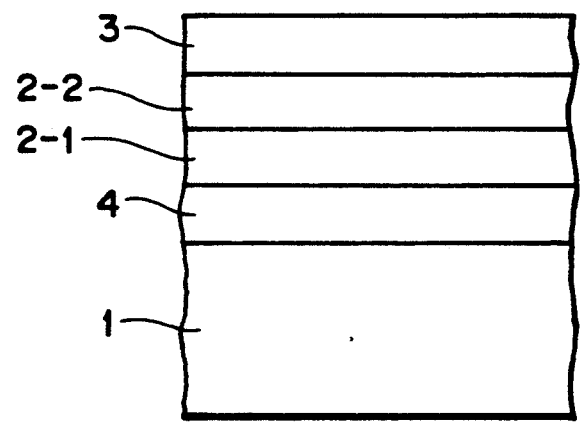
Figure 3:
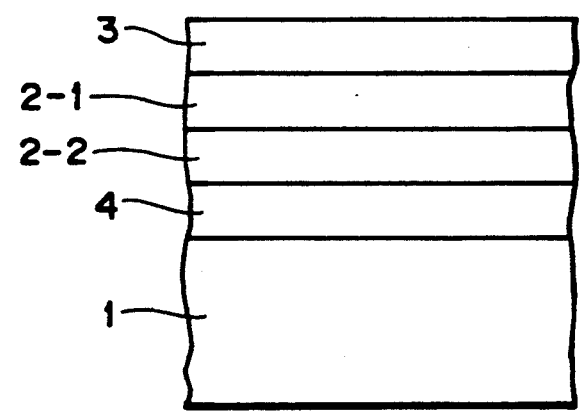

Referring now to the drawings, wherein like reference numerals designate identical or corresponding parts throughout the several views, FIG.1 to FIG.3 show representative examples of the structure of the optical recording medium of the present invention.

The structure shown in FIG.1 is the simplest configuration of the optical recording medium of the present invention. It is acceptable to merely form a first recording layer 2-1 and a second recording layer 2-2 on a substrate 1, as illustrated in FIG.1, but as required, as illustrated in FIG.2 and FIG.3, an undercoating layer 4 may be interposed between the substrate 1 and the first and second recording layers 2-1, 2-2, and a protective layer 3 may be formed on the recording layers 2-1, 2-2.

In the case where the protective layer 3 is not provided, the first recording layer 2-1 comprising a light-absorbing organic compound, and the second recording layer 2-2 comprising a sulfide containing 50 atm % or more of antimony are laminated on the substrate 1 in the order of the first recording layer 2-1 and the second recording layer 2-2 as illustrated in FIG.1. However, in the case where the protective layer 3 is provided, the first recording layer 2-1, the second recording layer 2-2, and the protective layer 3 are laminated either in the order of the first recording layer 2-1, the second recording layer 2-2 and the protective layer 3, or in the order of the second recording layer 2-2, the first recording layer 2-1, and the protective layer 3.

Recording by illuminating with light is preferably conducted from the substrate 1 side, but when the light permeability of the substrate 1 is low, the recording can be carried out from the recording layer 2-1, 2-2 side equally as well.

The material of construction for the substrate 1 can be a transparent plastic or glass, or the like. Specific examples which can be given include polycarbonate resin, polyolefin resin, acrylic resin, epoxy resin, quartz glass, and the like. A guide groove or guide pit may be provided in the surface of the substrate for tracking purposes, and, in addition, the surface may be preformatted to contain an address signal or the like.

The light-absorbing organic compound for the first recording layer 2-1 can be, for example, a light-absorbing dye, a light-absorbing dye compounded with a resin, a mixture of a light-absorbing dye and a resin, or an organic material in which finely-divided metal particles are dispersed.

Specific examples of the light-absorbing dye include cyanine dye, phthalocyanine dye, naphthalocyanine dye, squarylium dye, naphthoquinone dye, metal indoaniline dye, and azulenium dye.

Specific examples of the resin with which the light-absorbing dye can be mixed or compounded include polycarbonate resin, acrylic resin, vinyl resin, and alkyl resins.

As an organic material in which finely-divided metal particles are dispersed, for example, Te/alkyl resin, and Bi/alkyl resin can be used.

As the light-absorbing organic compound for use in the present invention, there can be employed compounds which be formed into a thin layer by coating, and can easily be deformed through decomposition by light absorption with high sensitivity. Preferable examples of such light-absorbing organic compound are cyanine dyes of the following general formula:

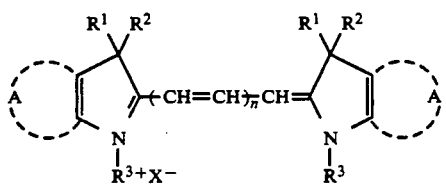

wherein $R^1$, $R^2$, and $R^3$ each represent an alkyl group having 1 to 6 carbon atoms, and may be the same or different; X is a halogen, a perhalogen acid, boron tetrafluoride, toluenesulfonic acid, or an alkylsulfuric acid; A is a benzene ring or a naphthyl ring either of which may have as a substituent an alkyl group having 1 to 4 carbon atoms, an alkoxyl group having 1 to 4 carbon atoms, a hydroxyl group, a carboxyl group, halogen, an allyl group, or an alkylcarboxyl group on the ring; and n is an integer of 0 to 3.

The thickness of the first recording layer 2-1 depends on the material but is preferably in the 100 to 3000 Å range.

The second recording layer 2-2 comprises a sulfide containing 50 atm % or more of antimony and is deformed to project in accordance with the deformation of the first recording layer 2-1 by the decomposition deformation thereof.

Other elements which can be used as component elements of the components for the second recording layer 2-2 are, for example, In, Au, Sn, and Cu.

Specific examples of the material for the second recording layer 2-2 are $Sb_{70}In_{15}S_{15}$, and $Sb_{70}Sn_{15}S_{15}$.

If the Sb content of the recording layer 2-2 is less than 50 atm %, the recording layer is deformed with difficulty so that the recording sensitivity is reduced.

It is preferable that the recording layer 2-2 be in the 100 to 3000 Å range, more preferably in the range of 1000 Å or less, to provide a recording layer which is readily deformed.

A vacuum deposition method using resistance heating with a single deposition source or a multiple deposition source is utilized in forming the second recording layer 2-2, but the sputtering method or the Electron Beam deposition method can be used equally as well.

The undercoat layer 4 functions (1) as a barrier against moisture and gasses, gas barrier, and the like, (2) to ensure the maintenance of stability in the recording layer, (3) to improve the reflectance, and (4) to form pregrooves and the like in the optical recording medium. If importance is placed on the above functions (1) and (2), the material for construction of the undercoat layer 4 can be a polymeric material such as acrylic resin and epoxy resin, an inorganic compound such as $SiO_2$, ZnS, TiN, SiN and $Al_2O_3$, or a metal or semi-metal such as Au, Ni, Cr, and Se. If importance is placed on function (3), the material can be an inorganic compound such ZnS, $Sb_2S_3$, SnS, and InS, or a metal such as Al, Ag, and Au. To emphasize function (4), various types of ultraviolet-curable resins, heat-curable resins, or thermoplastic resins can be used.

The thickness of the undercoating layer 4 depends on the type of material used, but about 0.1 to 30μm is a preferable range.

The protective layer 3 is provided, for example, (1) to protect the recording layer 2-1 or 2-3 from scratches, dust, staining, and the like, (2) to improve the maintenance of stability in the recording layer 2-1 or 2-2, and (3) to improve the reflectance. As a material for construction of the protective layer 3, any of the materials given as examples for the undercoat layer 4 can be used. As with the undercoat layer 4, the thickness of the protective layer 3 varies according to the material used, but about 0.1 to 100 μm is a preferable range. Methods which are known conventionally, such as vacuum film-forming methods (deposition, sputtering, and the like) for inorganic materials, and solution coating methods (spinner coating, spray coating, dip coating, and the like) for organic materials, can be adopted as means for forming the protective layer 3 and the undercoating layer 4.

In the present invention, recording is performed by decomposing and deforming the recording layer 2-1 with application of a condensed laser beam onto the surface of the recording layer of the optical recording medium of the present invention, causing a pressure change in the recording layer 2-1, so that recording occurs in the form of projections from the recording layer side.

At this time, because the first recording layer 2-1 comprises a light-absorbing organic compound, in particular, a compound containing a cyanine dye, and the second recording layer 2-2 comprises a sulfide containing 50 atm % or more of antimony, a large change in reflectance can be obtained at a low recording power, as compared with a conventional single-layer type optical recording medium using a light-reflecting-and-absorbing dye such as cyanine dye or the like.

In addition, because of the configuration of the present invention, the products of decomposition of the light-absorbing organic compound in the first recording layer 2-1 are not scattered, therefore no increase in noise is produced from this cause.

EXAMPLE 1

A light-absorbing compound represented by the following formula No. 1 was dissolved in 1,2-dichloroethane to prepare a light-absorbing organic compound layer coating liquid was prepared.

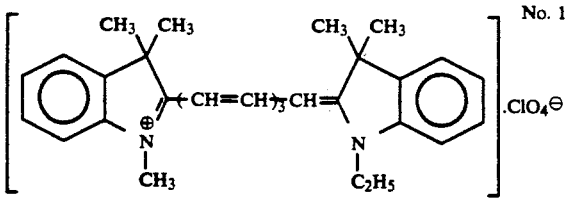

No. 1

The thus prepared light-absorbing organic compound layer coating liquid was applied by spin-coating to a thickness of about 700Å on a dry basis on a substrate made of a polymethyl methacrylate (PMMA) disk with a thickness of 1.2 mm and a diameter of 130 mm provided with a spiral guide groove for tracking, by use of an acrylic photopolymer, whereby a light-absorbing organic compound layer, serving as a first recording layer, was formed on the substrate.

A thin layer of $Sb_{70}Sn_{15}S_{15}$, serving as a second recording layer, was formed with a thickness of about 700Å on the above light-absorbing organic compound layer by vacuum deposition using two deposition sources, one for Sb and the other for SnS, whereby an optical recording medium No. 1 according to the present invention was prepared.

EXAMPLE 2

The procedure for Example 1 was repeated except that the thin layer of $Sb_{70}Sn_{15}S_{15}$, serving as the second recording layer, was replaced by a thin layer of $Sb_{70}In_{15}S_{15}$, which was formed with a thickness of about 700Å on the light-absorbing organic compound layer by vacuum deposition using two deposition sources, one for Sb and the other for InS, whereby an optical recording medium No. 2 according to the present invention was prepared.

EXAMPLE 3

The procedure for Example 1 was repeated except that the thin layer of $Sb_{70}Sn_{15}S_{15}$, serving as the second recording layer, was replaced by a thin layer of $Sb_{85}S_{15}$, was formed with a thickness of about 400 to 800Å on the light-absorbing organic compound layer by vacuum deposition using two deposition sources, one for Sb and the other for $Sb_2S_3$, whereby an optical recording medium No. 3 according to the present invention was prepared.

EXAMPLE 4

A light-absorbing compound represented by the following formula No. 2 was dissolved in 1,2-dichloroethane to prepare a light-absorbing organic compound layer coating liquid was prepared.

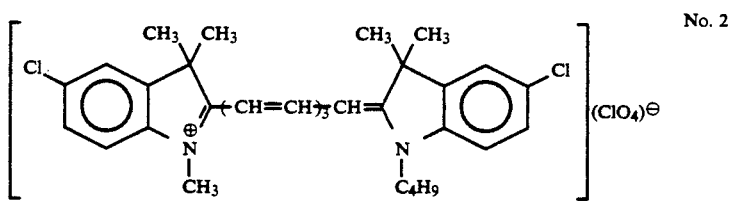

No. 2

The thus prepared light-absorbing organic compound layer coating liquid was applied by spin-coating to a thickness of about 700 Å on a dry basis on the same substrate as employed in Example 1, provided with a spiral guide groove for tracking, by use of an acrylic photopolymer, whereby a light-absorbing organic compound layer, serving as a first recording layer, was formed on the substrate.

A thin layer of $Sb_{70}In_{15}S_{15}$, which was formed with a thickness of about 700Å on the light-absorbing organic compound layer by vacuum deposition using two deposition sources, one for Sb and the other for InS, whereby an optical recording medium No. 4 according to the present invention was prepared.

EXAMPLE 5

The procedure for Example 4 was repeated except that the light-absorbing compound of formula No. 2 employed in Example 4 was replaced by the following light-absorbing compound represented by the following formula No. 3, whereby an optical recording medium No. 5 according to the present invention was prepared:

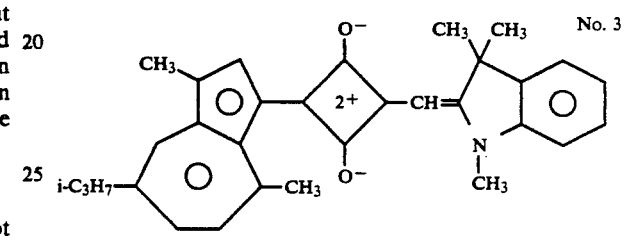

No. 3

EXAMPLE 6

A mixture of 10 parts by weight of the light-absorbing compound of formula No. 1 employed in Example 1 and 1 part of polycarbonate resin was dissolved in 1,2-dichloroethane to prepare a light-absorbing organic compound layer coating liquid was prepared.

The thus prepared light-absorbing organic compound layer coating liquid was applied by spin-coating to a thickness of about 700 Å on a dry basis on the same substrate as employed in Example 1, provided with a spiral guide groove for tracking, by use of an acrylic photopolymer, whereby a light-absorbing organic compound layer, serving as a first recording layer, was formed on the substrate.

A thin layer of $Sb_{70}In_{15}S_{15}$, serving as a second recording layer, was formed with a thickness of about 700Å on the above light-absorbing organic compound layer by vacuum deposition using two deposition sources, one for Sb and the other for InS, whereby an optical recording medium No. 6 according to the present invention was prepared.

EXAMPLE 7

The procedure for Example 7 was repeated except that the mixture of 10 parts by weight of the light-absorbing compound of formula No. 1 and 1 part of polycarbonate resin employed in Example 6 was replaced by a mixture of 20 parts by weight of the light-absorbing compound of formula No. 1 and 1 part of acrylic resin, whereby an optical recording medium No. 7 according to the present invention was prepared.

COMPARATIVE EXAMPLE 1

The procedure for Example 1 was repeated except that the second recording layer was not provided on the first recording layer, whereby a comparative optical recording medium No. 1 was prepared.

COMPARATIVE EXAMPLE 2

The procedure for Example 4 was repeated except that the second recording layer was not provided on the first recording layer, whereby a comparative optical recording medium No. 2 was prepared.

COMPARATIVE EXAMPLE 3

The procedure for Example 5 was repeated except that the second recording layer was not provided on the first recording layer, whereby a comparative optical recording medium No. 3 was prepared.

The optical recording media No. 1 to No. 7 according to the present invention and comparative optical recording media No. 1 to No. 3 were then installed in an optical disk tester, recording and reproduction tests were conducted for recording and reproducing 7.5MHz and 3.7MHz signals under the conditions that the wavelength of the laser beam was 780 nm, the numerical aperture (NA) of the lens employed was 0.5, the line speed was 11.3 m/s, the recording laser power was 6 mW and 9 mW, and the amplitude of the output signals was measured by an oscilloscope.

The results of the above recording and reproduction tests are shown in Table 1. As can be seen from the results, the amplitudes of the output signals of all the examples of the optical recording media of the present invention were greater than those of the comparative recording media.

TABLE 1

| | Light-absorbing Organic Compound | Sb-containing Inorganic Compound | Amplitude of Output Signal (Arbitrary Unit) | | | |
|---|---|---|---|---|---|---|
| | | | 6 mW | | 9 mW | |
| | | | 3.7 MHz | 7.5 MHz | 3.7 MHz | 7.5 MHz |
| Ex. 1 | No. 1 | $Sb_{70}Sn_{15}S_{15}$ | 240 | — | — | 120 |
| Ex. 2 | No. 1 | $Sb_{70}In_{15}S_{15}$ | 250 | — | — | 120 |
| Ex. 3 | No. 1 | $Sb_{85}S_{15}$ | 200 | — | — | 100 |
| Ex. 4 | No. 2 | $Sb_{70}In_{15}S_{15}$ | — | — | 200 | — |
| Ex. 5 | No. 3 | $Sb_{70}In_{15}S_{15}$ | — | — | 60 | — |
| Ex. 6 | Mixture of No. 1 and polycarbonate resin (10:1) | $Sb_{70}In_{15}S_{15}$ | 230 | — | — | 120 |
| Ex. 7 | Mixture of No. 1 and acrylic resin (20:1) | $Sb_{70}In_{15}S_{15}$ | 240 | — | — | 110 |
| Comp. Ex. 1 | No. 1 | — | 70 | 20 | 160 | 40 |
| Comp. Ex. 2 | No. 2 | — | 50 | — | 100 | 20 |
| Comp. Ex. 3 | No. 3 | — | 20 | — | 50 | 0 |

In addition, the recording pits of these optical recording media were observed using an SEM. Projecting distortions were observed in the pit portions of the recording layer to be directed toward the recording layer in all the recording media of the present invention, and no material was observed scattered on the recording surface. As opposed to this, indented distortions were observed in the pit portions of the recording layer in all of the comparative recording media, and scattering of decomposed or melted material from the recording film was evident on the surface.

The above explanation clearly shows that, as opposed to the single recording layer of a light reflection absorbing pigment of a conventional recording medium, the present invention provides an optical recording medium in which a large change in reflectance can be obtained with low laser power, and in which no noise or errors develop as a result of the recording film which is removed.

What is claimed is:

1. An optical recording medium comprising: a substrate, and a recording layer formed thereon, which comprises (a) a first recording layer comprising a light-absorbing organic compound, said first recording layer being capable of being deformed upon irradiation of light thereto; and (b) a second recording layer comprising a sulfide containing antimony in an amount of 50 atm % or more, said second recording layer being capable of being deformed in accordance with the deformation of said first recording layer.

2. The optical recording medium as claimed in claim 1, wherein said light-absorbing organic compound is selected from the group consisting of phthalocyanine dye, naphthalocyanine dye, metal indoaniline dye, and azulenium dye.

3. The optical recording medium as claimed in claim 1 wherein said light-absorbing organic compound is a cyanine dye.

4. The optical recording medium as claimed in claim 2, wherein said cyanine dye is a compound having formula

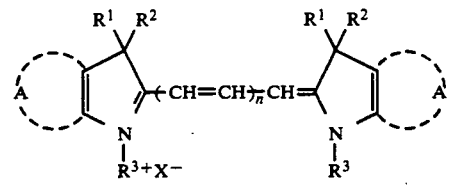

wherein $R^1$ and $R^3$ each represent an alkyl group having 1 to 6 carbon atoms, and may be the same or different; X is a halogen, a perhalogen acid, boron tetrafluoride, toluene-sulfonic acid, or an alkylsulfuric acid; A is a benzene ring or a naphthyl ring either of which may have as a substituent an alkyl group having 1 to 4 carbon atoms, an alkoxyl group having 1 to 4 carbon atoms, a hydroxyl group, a carboxyl group, halogen, an allyl group, or an alkylcarboxyl group on the ring; and n is an integer of 0 to 3.

5. The optical recording medium as claimed in claim 4, wherein said cyanine dye is selected from the group consisting of:

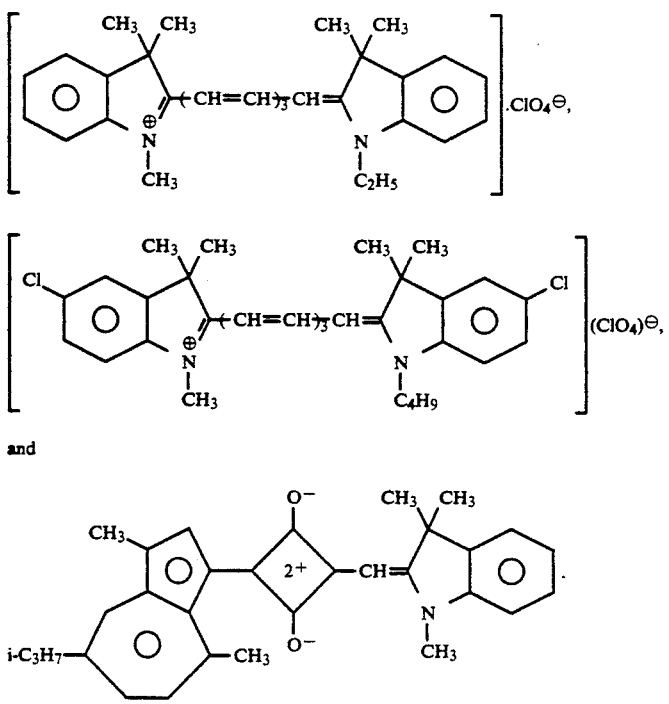

6. The optical recording medium as claimed in claim 1, wherein said first recording layer further comprises a resin, which is mixed with said light-absorbing organic compound.

7. The optical recording medium as claimed in claim 1, wherein said first recording layer further comprises a resin, which is compounded with said light-absorbing organic compound.

8. The optical recording medium as claimed in claim 6, wherein said resin further comprises finely-divided particles of a metal.

9. The optical recording medium as claimed in claim 6, wherein said resin is selected from the group consisting of polycarbonate resin, acrylic resin, vinyl resin, and alkyl resin.

10. The optical recording medium as claimed in claim 7, wherein said resin is selected from the group consisting of polycarbonate resin, acrylic resin, vinyl resin, and alkyl resin.

11. The optical recording medium as claimed in claim 1, wherein said first recording layer has a thickness ranging from 100 to 3000Å.

12. The optical recording medium as claimed in claim 1, wherein said second recording layer has a thickness ranging from 100 to 3000Å.

13. The optical recording medium as claimed in claim 1, further comprising an undercoat layer which is interposed between said substrate and said first or second recording layer.

* * * * *